(12) United States Patent
Wedzikowski et al.

(10) Patent No.: US 11,617,053 B2
(45) Date of Patent: Mar. 28, 2023

(54) MOBILE VISITOR MANAGEMENT

(71) Applicants: Lucien Wedzikowski, Paris (FR); Otis Elevator Company, Farmington, CT (US)

(72) Inventors: Lucien Wedzikowski, Paris (FR); Bradley Armand Scoville, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1206 days.

(21) Appl. No.: 16/091,061

(22) PCT Filed: Apr. 6, 2016

(86) PCT No.: PCT/IB2016/000593
§ 371 (c)(1),
(2) Date: Oct. 3, 2018

(87) PCT Pub. No.: WO2017/175020
PCT Pub. Date: Oct. 12, 2017

(65) Prior Publication Data
US 2019/0122462 A1   Apr. 25, 2019

(51) Int. Cl.
*H04W 4/021* (2018.01)
*B66B 1/46* (2006.01)
(Continued)

(52) U.S. Cl.
CPC ........... *H04W 4/021* (2013.01); *B66B 1/3461* (2013.01); *B66B 1/468* (2013.01); *G07C 9/21* (2020.01);
(Continued)

(58) Field of Classification Search
CPC ..... H04W 4/021; H04W 4/027; H04W 4/029; H04W 4/33; B66B 1/3461; B66B 1/468;
(Continued)

(56) References Cited

U.S. PATENT DOCUMENTS

| 5,960,085 A | 9/1999 | De la Huerga |
| 7,114,178 B2 | 9/2006 | Dent et al. |

(Continued)

FOREIGN PATENT DOCUMENTS

| CN | 101844713 A | 9/2010 |
| CN | 101927920 A | 12/2010 |

(Continued)

OTHER PUBLICATIONS

Indian Examination Report for Application No. 201817040930; dated Jan. 29, 2021; 6 Pages.

(Continued)

*Primary Examiner* — Mahendra R Patel
(74) *Attorney, Agent, or Firm* — Cantor Colburn LLP

(57) ABSTRACT

A system and method of managing visitor access to an elevator using a mobile device of the visitor is provided. The method includes generating a visitor invitation based on a tenant input using an electronic device, receiving the visitor invitation at the mobile device of the visitor, and gaining limited access to designated floor based on limitation values contained in the visitor invitation.

18 Claims, 4 Drawing Sheets

(51) Int. Cl.
| | |
|---|---|
| *G07C 9/28* | (2020.01) |
| *G07C 9/29* | (2020.01) |
| *H04M 1/72436* | (2021.01) |
| *G07C 9/21* | (2020.01) |
| *B66B 1/34* | (2006.01) |
| *H04W 4/029* | (2018.01) |
| *H04W 4/33* | (2018.01) |
| *H04W 4/02* | (2018.01) |

(52) U.S. Cl.
CPC ............... *G07C 9/28* (2020.01); *G07C 9/29* (2020.01); *H04M 1/72436* (2021.01); *B66B 2201/4653* (2013.01); *B66B 2201/4676* (2013.01); *H04W 4/027* (2013.01); *H04W 4/029* (2018.02); *H04W 4/33* (2018.02)

(58) Field of Classification Search
CPC .... B66B 2201/4653; B66B 2201/4676; G07C 9/21; G07C 9/28; G07C 9/29; G07C 9/27; G07C 9/00309; H04M 1/72436; H04M 1/72403
USPC .......................................................... 187/380
See application file for complete search history.

(56) References Cited

U.S. PATENT DOCUMENTS

| | | | |
|---|---|---|---|
| 7,170,998 | B2 | 1/2007 | McLintock et al. |
| 7,212,114 | B2 | 5/2007 | Yui et al. |
| 7,315,823 | B2 | 1/2008 | Brondrup |
| 7,377,364 | B2 | 5/2008 | Tyni et al. |
| 7,606,558 | B2 | 10/2009 | Despain et al. |
| 7,620,817 | B2 | 11/2009 | Friedli et al. |
| 7,733,213 | B2 | 6/2010 | Levine |
| 7,886,336 | B2 | 2/2011 | Schuster et al. |
| 7,899,470 | B2 | 3/2011 | Bhakta et al. |
| 8,482,378 | B2 | 7/2013 | Sadighi et al. |
| 8,635,462 | B2 | 1/2014 | Ullmann |
| 8,689,353 | B2 | 4/2014 | Bunter |
| 8,730,004 | B2 | 5/2014 | Elfstrom et al. |
| 8,744,754 | B2 | 6/2014 | Kappeler et al. |
| 8,793,784 | B2 | 7/2014 | Metivier et al. |
| 8,833,525 | B2 | 9/2014 | Gerstenkorn et al. |
| 8,903,425 | B2 | 12/2014 | Guenec et al. |
| 9,007,173 | B2 | 4/2015 | McIntyre et al. |
| 9,077,716 | B2 | 7/2015 | Myers et al. |
| 9,129,450 | B2 | 9/2015 | Robertson et al. |
| 9,196,104 | B2 | 11/2015 | Dumas et al. |
| 2005/0010756 | A1 | 1/2005 | Clerc |
| 2007/0176739 | A1 | 8/2007 | Raheman |
| 2009/0066476 | A1 | 3/2009 | Raheman |
| 2012/0310852 | A1 | 12/2012 | Ramalingamoorthy et al. |
| 2013/0024222 | A1 | 1/2013 | Dunn |
| 2013/0031611 | A1 | 1/2013 | Barreto |
| 2014/0049370 | A1 | 2/2014 | Eberwine et al. |
| 2014/0339023 | A1 | 11/2014 | Friedli |
| 2014/0340196 | A1 | 11/2014 | Myers et al. |
| 2015/0109104 | A1 | 4/2015 | Fadell et al. |
| 2015/0109128 | A1* | 4/2015 | Fadell ................. G08B 25/008 340/540 |
| 2015/0158696 | A1 | 6/2015 | Miyajima et al. |
| 2015/0170448 | A1 | 6/2015 | Robfogel et al. |
| 2015/0181014 | A1 | 6/2015 | Gerhardt et al. |
| 2015/0194000 | A1* | 7/2015 | Schoenfelder ..... G07C 9/00309 340/5.61 |
| 2015/0204678 | A1 | 7/2015 | Schuster |
| 2015/0221152 | A1 | 8/2015 | Andersen |
| 2015/0235496 | A1 | 8/2015 | Vecchiotti et al. |
| 2015/0240531 | A1 | 8/2015 | Blust et al. |
| 2015/0339871 | A1 | 11/2015 | Wagner et al. |
| 2016/0047142 | A1 | 2/2016 | Gengler |
| 2016/0050515 | A1 | 2/2016 | Johnson |
| 2016/0055695 | A1 | 2/2016 | Saeedi et al. |
| 2016/0300160 | A1* | 10/2016 | Klein ................... H04W 8/005 |

FOREIGN PATENT DOCUMENTS

| | | | | |
|---|---|---|---|---|
| CN | 102449667 | A | | 5/2012 |
| CN | 103231949 | A | * | 8/2013 |
| CN | 103508274 | A | | 1/2014 |
| CN | 104321266 | A | | 1/2015 |
| CN | 104411613 | A | * | 3/2015 ........... B66B 1/2408 |
| EP | 2085934 | A1 | | 8/2009 |
| EP | 2620919 | A1 | | 7/2013 |
| JP | 2007131434 | A | | 5/2007 |
| JP | 2008114950 | A | * | 5/2008 |
| JP | 2008114950 | A | | 5/2008 |
| JP | 2009220924 | A | | 10/2009 |
| WO | 2013049730 | A1 | | 4/2013 |
| WO | 2014066016 | A2 | | 5/2014 |
| WO | 2015049187 | A1 | | 4/2015 |
| WO | 2015124168 | A1 | | 8/2015 |
| WO | 2016010508 | A2 | | 1/2016 |

OTHER PUBLICATIONS

Chinese Office Action for Application No. 201680084786.7; dated Jun. 30, 2020; 11 Pages.
Japanese Office Action for Application No. 2018-552755; dated Jan. 14, 2020; 3 Pages.
Friday Labs, "Friday Labs—Lock", available at: http://www.fridaylabs.net/views/home-page.html, accessed: Oct. 3, 2018, 19 pages.
International Search Report and Written Opinion for application PCT/IB2016/000593, dated Dec. 1, 2016, 10 pages.
LOCKITRON; Unlock Bolt from anywhere; Internet; URL: https://lockitron.com/; 5 pgs.
Robards; "myPORT app unlocks doors and calls elevators for you"; GIZMAG; Dec. 2014; Internet; URL: http://www.gizmag.com/myport-building-access-app/35084/; 6 pgs.
Woollaston; "The Smart Lock lets open door using just your phone—and can even let in guests when you're not home"; May 30, 2013; Internet; URL: http://www.dailymail.co.uk/sciencetech/article-2333375/; 4 pgs.

* cited by examiner

MOBILE VISITOR MANAGEMENT

TECHNICAL FIELD

The subject matter disclosed herein generally relates to advanced features for visitor building access, and more specifically, access management of visitors using mobile devices.

DESCRIPTION OF RELATED ART

Current systems for allowing visitors access to buildings in which they are not tenants, such as residents or employees, generally require a tenant to meet his or her visitors in the lobby or at the private access point and personally escort them to the tenant's floor. Another scenario includes a tenant having to pre-register the visitor with building security and then the visitor having to show ID to get past the front desk. While this ensures access to the building remains restricted to tenants and select visitors only, the inconvenience for tenants is significant.

Accordingly, there exists a desire for a method of visitor management that would maintain the same level of security and regulated access, but that is less burdensome for the tenant.

SUMMARY

According to one embodiment a method of managing visitor access to an elevator using a mobile device of the visitor is provided. The method includes generating a visitor invitation based on a tenant input using an electronic device, receiving the visitor invitation at the mobile device of the visitor, and gaining limited access to designated floor based on limitation values contained in the visitor invitation.

In addition to one or more of the features described above, or as an alternative, further embodiments may include validating, using a building management system, the visitor mobile device in response to the visitor accepting and the visitor invitation, and notifying tenant in response to the visitor mobile device being validated or gaining limited access.

In addition to one or more of the features described above, or as an alternative, further embodiments may include wherein generating the visitor invitation based on a tenant input includes generating the visitor invitation using one selected from a group consisting of the building manager system and the electronic device of the tenant.

In addition to one or more of the features described above, or as an alternative, further embodiments may include requesting, using the electronic device of the tenant, a grant to generate the visitor invitation from the building manager system, and receiving the grant to generate the visitor invitation from the building manager system.

In addition to one or more of the features described above, or as an alternative, further embodiments may include wherein receiving the visitor invitation at the visitor mobile device of the visitor includes receiving, at the visitor mobile device, an email with a web link to download the visitor invitation, wherein clicking the link downloads the visitor invitation onto the visitor mobile device.

In addition to one or more of the features described above, or as an alternative, further embodiments may include wherein receiving the visitor invitation at the mobile device of the visitor includes receiving, at the visitor mobile device, the visitor invitation through a visitor access management application loaded on the visitor mobile device.

In addition to one or more of the features described above, or as an alternative, further embodiments may include wherein validating, using the building management system, the visitor mobile device includes validating automatically based on a digital credential that is included in the visitor invitation.

In addition to one or more of the features described above, or as an alternative, further embodiments may include wherein validating, using the building management system, the visitor mobile device includes checking-in with a front desk of a building with the visitor mobile device, displaying a digital certificate on the visitor mobile device, visually inspecting the displayed digital certificate at the front desk, and entering validation of the visitor mobile device in the building management system based on the visual inspection.

In addition to one or more of the features described above, or as an alternative, further embodiments may include wherein gaining limited access to designated floor based on limitation values contained in the visitor invitation includes receiving privileges to directly access building resources from the building management device, storing the privileges in the visitor mobile device, using the privileges stored in the visitor mobile device to directly communicate with building resources including the elevator.

In addition to one or more of the features described above, or as an alternative, further embodiments may include wherein gaining limited access to designated floor based on limitation values contained in the visitor invitation includes transmitting a control signal to a building resource from the building management device based on the visitor mobile device location.

In addition to one or more of the features described above, or as an alternative, further embodiments may include wherein the limitation values contained in the visitor invitation includes one or more from a group consisting of a defined time period, a specific floor, a single use limit, and a select number of accesses.

In addition to one or more of the features described above, or as an alternative, further embodiments may include wherein notifying tenant in response to the visitor mobile device being validated or gaining limited access includes notifying the tenant automatically when a user enters a select building resource that includes the elevator.

In addition to one or more of the features described above, or as an alternative, further embodiments may include wherein notifying tenant in response to the visitor mobile device being validated or gaining limited access includes notifying the tenant using one or more of a doorbell, an email, a text message, an automated call, a visual alert, an application notification, a vibration matter, and a power toggling of a select electronic device.

According to an embodiment, a system for managing visitor access to an elevator using a mobile device is provided. The system includes an electronic device of a tenant configured to receive an input from the tenant and transmit the tenant input, a building management system including a receiver configured to receive the tenant input from the electronic device of the tenant to generate a visitor invitation, a controller configured to grant or generate the visitor invitation for building resources based on the tenant input, and grant limited access to the visitor mobile device, and a transmitter configured to transmit the visitor invitation to the visitor mobile device, and transmit a grant to the visitor mobile device, and the elevator including a controller and at least one car, wherein the elevator is configured to transport the visitor based on the limited access in the visitor invitation.

In addition to one or more of the features described above, or as an alternative, further embodiments may include wherein the electronic device of the tenant is further configured to request a grant from the controller to generate the visitor invitation, and generate the visitor invitation upon receiving the grant from the controller, and wherein the controller of the building management system is further configured to validate the visitor mobile device in response to the visitor mobile device arriving at the building resources with the visitor invitation.

According to an embodiment, a computer program product for managing visitor access to an elevator using a visitor mobile device of the visitor is provided. The computer program product including a computer readable storage medium having program instructions embodied therewith, the program instructions executable by a processor to cause the processor to generate a visitor invitation based on a tenant input using an electronic device, receive the visitor invitation at the visitor mobile device of the visitor, and gain limited access to designated floor based on limitation values contained in the visitor invitation.

In addition to one or more of the features described above, or as an alternative, further embodiments may include additional program instructions executable by the processor to cause the processor to request, using the electronic device of the tenant, a grant to generate the visitor invitation from the building manager system, and receive the grant to generate the visitor invitation from the building manager system.

In addition to one or more of the features described above, or as an alternative, further embodiments may include additional program instructions executable by the processor to cause the processor to check-in with a front desk of a building with the visitor mobile device, display a digital certificate on the visitor mobile device, visually inspect the displayed digital certificate at the front desk, and enter validation of the visitor mobile device in the building management system based on the visual inspection.

In addition to one or more of the features described above, or as an alternative, further embodiments may include additional program instructions executable by the processor to cause the processor to receive privileges to directly access building resources from the building management device, store the privileges in the visitor mobile device, use the privileges stored in the visitor mobile device to directly communicate with building resources including the elevator.

In addition to one or more of the features described above, or as an alternative, further embodiments may include additional program instructions executable by the processor to cause the processor to validate, using a building management system, the visitor mobile device in response to the visitor accepting and the visitor invitation, and notify tenant in response to the visitor mobile device being validated or gaining limited access.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
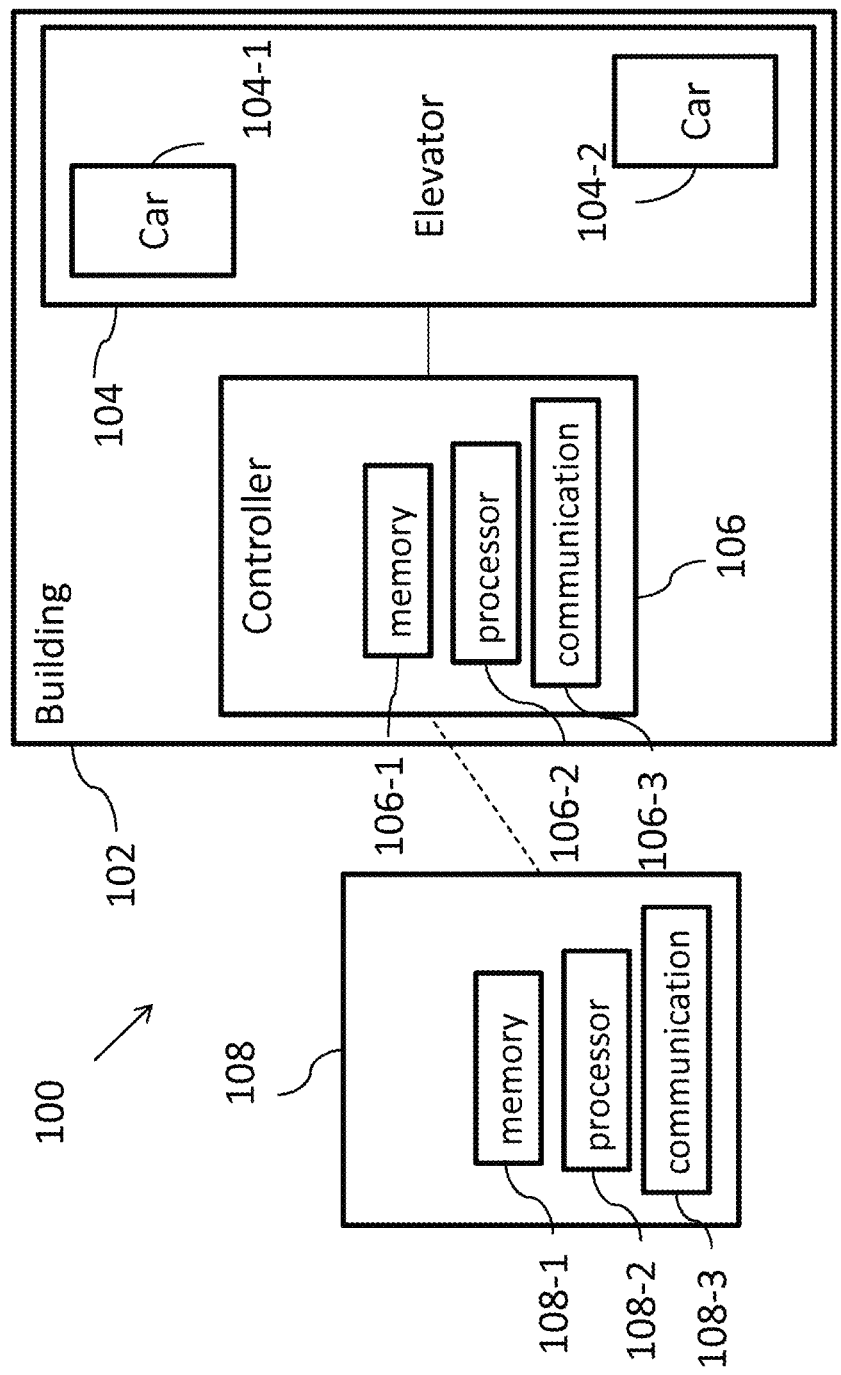
FIG. 1 depicts an elevator system in accordance with one or more embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to a method and system for mobile visitor management that allows a tenant's visitor direct access to the tenant's floor by way of the building's elevator system. In one embodiment, the system does so through a mobile application on the visitor's phone, which receives an invitation from the building's management, as prompted by the tenant, and upon acceptance of that invitation, the visitor's phone is commissioned with elevator and security mobile credentials to interact with the building upon arrival so that the visitor has direct access to the tenant's floor only, by way of the building's elevator system. According to another embodiment, the credentials can include door credentials to get through applicable secured doors to get to tenant location. For example, the credentials may include a building front door credential so that it visitor can unlock and enter the building. The credential included may also contain a kiosk credential so that a user can pass through an elevator turnstile. Further, according to another embodiment, the credentials may include a credential for the tenant door so that the visitor can proceed out of the elevator and straight into the tenant's space. In accordance with one or more embodiments, the credentials than may be included can be limited and defined by either the building management/security as well as the tenant themselves.

Turning now to the figures, FIG. 1 depicts an elevator system 100 in accordance with one or more embodiments. The elevator system 100 is shown installed at a building 102. In some embodiments, the building 102 may be an office building or a collection of office buildings that may or may not be physically located near each other. The building 102 may include a number of floors. Persons entering the building 102 may enter at a lobby floor, or another floor, and may go to a destination floor via one or more conveyance devices, such as an elevator 104.

The elevator 104 may be coupled to one or more computing devices, such as a controller 106. The controller 106 may be configured to control dispatching operations for one or more elevator cars (e.g., cars 104-1, 104-2) associated with the elevator 104. The elevator cars 104-1 and 104-2 may be located in the same hoistway or in different hoist ways so as to allow coordination amongst elevator cars in different elevator banks serving different floors. It is understood that other components of the elevator system 100 (e.g., drive, counterweight, safeties, etc.) are not depicted for ease of illustration.

Also shown in FIG. 1 is a mobile device 108. The mobile device 108 may include a device that is typically carried by a person, such as a phone, electronic wearable, RFID tag, tablet, PDA, etc. The mobile device 108 may include a processor 108-2, a memory 108-1, and a communication module 108-3 as shown in FIG. 1. The processor 108-2 can be any type or combination of computer processors, such as a microprocessor, microcontroller, digital signal processor, application specific integrated circuit, programmable logic device, and/or field programmable gate array. The memory 108-1 is an example of a non-transitory computer readable storage medium tangibly embodied in the mobile device 108 including executable instructions stored therein, for instance, as firmware. The communication module 108-3 may implement one or more communication protocols as described in further detail herein.

The controller 106 may include a processor 106-2, a memory 106-1, and communication module 106-3 as shown in FIG. 1. The processor 106-2 can be any type or combination of computer processors, such as a microprocessor, microcontroller, digital signal processor, application specific integrated circuit, programmable logic device, and/or field programmable gate array. The memory 106-1 is an example of a non-transitory computer readable storage medium tangibly embodied in the controller 106 including executable instructions stored therein, for instance, as firmware. The communication module 106-3 may implement one or more communication protocols as described in further detail herein.

The mobile device 108 and the controller 106 communicate with one another. According to one or more embodiments, the communication between the mobile device 108 and the controller 106 is done through other systems such as transmitters, converters, receivers, and other transmitting and processing elements depending on the communication type selected. For example, the mobile device 108 and the controller 106 may communicate with one another when proximate to one another (e.g., within a threshold distance). The mobile device 108 and the controller 106 may communicate over a wireless network, such as 802.11x (WiFi), short-range radio (Bluetooth), or any other known type of wireless communication. In some embodiments, the controller 106 may include, or be associated with (e.g., communicatively coupled to) a networked element, such as kiosk, beacon, hall call fixture, lantern, bridge, router, network node, etc. The networked element may communicate with the mobile device 108 using one or more communication protocols or standards. For example, the networked element may communicate with the mobile device 108 using near field communications (NFC), or any type of known wired or wireless communication means. According to one or more other embodiments, the networked element may communicate with the mobile device 108 through a cellular network or over the internet through a number of other devices outside the building.

In other embodiments, the controller 106 may establish communication with a mobile device 108 that is outside of the building 102. This connection may be established with various technologies including GPS, triangulation, or signal strength detection, by way of non-limiting example. The communication connection that can be established includes, but is not limited to, a cellular connection, a WiFi connection, a Bluetooth connection, a peer-to-peer connection, a satellite connection, a NFC connection, some other wireless connection, and even a wired connection using an Ethernet cable, coaxial cable, or other data cable. These communication connections may transport data between the mobile device 108 using a number of different networks ranging from a private secure direct communication link to transporting the data over the internet through multiple different servers, switches, etc. Such technologies that allow early communication will provide users and the systems more time to establish the most efficient passenger flow, and may eliminate the need for a user to stop moving to interact with the system.

Implementation of a method and system of managing visitor access to an elevator using a visitor mobile device, controller, and elevator is described with reference to FIGS. 2-4.

Figure 2:
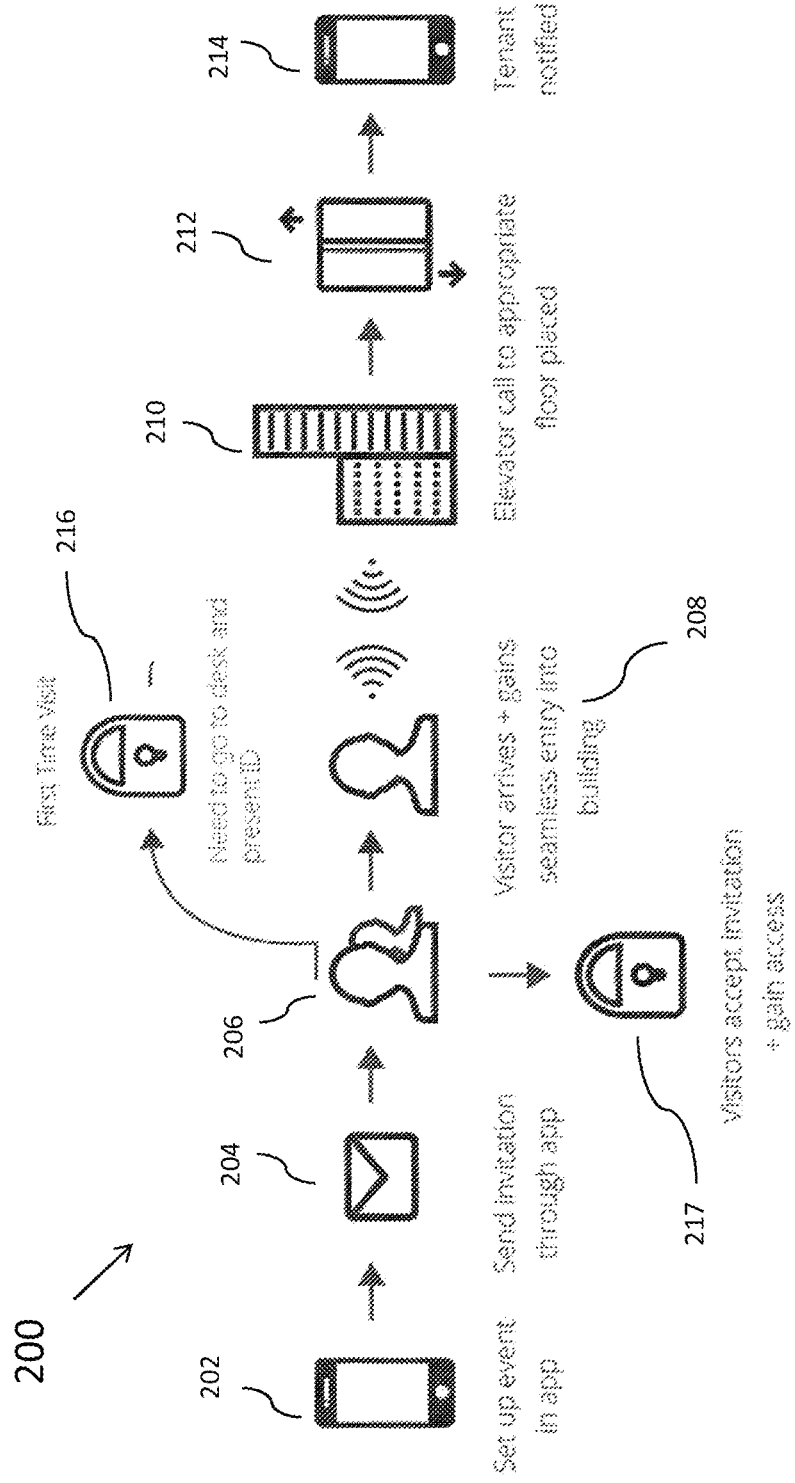
FIG. 2 depicts a system for managing visitor access to an elevator using a visitor mobile device in accordance with one or more embodiments of the present disclosure.

Referring to FIG. 2, a system 200 for a mobile communication and authorization process in accordance with one or more embodiments is shown. The system 200 includes an application on a mobile device 202. According to another embodiment, the system 200 includes a web based portal with one more or more graphical user interfaces that can be accessed using the mobile device or another electronic device such as a home computer. This application may exist on any mobile device, regardless of provider or operating system. In some embodiments, this mobile device may be a cell phone, wearable, a tablet, or a laptop. Once downloaded onto a tenant or resident's mobile device, a tenant or resident may create an event 202 in the application that indicates the arrival time and floor location. In some embodiments, the invitation options would be restricted such that the tenant or resident would only be allowed to create an event for the floor on which they reside or work, or communal spaces, based on information required of the tenant or resident when downloading their application for the first time and confirmed by building management. In other embodiments, the invitation options would be restricted such that the duration of the event, and therefore access by the visitor, could not be greater than a certain number of hours. In one embodiment, the invitation options would be restricted such that the tenant or resident may only give the visitor access during certain hours, such as the daytime, before 10 PM, or any other desired time frame.

Once the event information is finalized, an invitation for the event is created in the application and shared with the building's management. In some embodiments, the building's management will first approve the event details and upon approval, the invitation would be sent to the invited visitors. In other embodiments, the building's management would not need to approve the event details and as such, this information would be stored in the user's application upon receipt and would simultaneously be sent to the invited visitors. In some embodiments, the invitation could be shared with a visitor based on the visitor's email address, cell phone number, or application username, or any other identifying feature. In other embodiments, the invitation could be shared with a visitor by requiring the tenant to identify the invited visitor utilizing more specific personal information beyond contact information. For example, in a corporate setting, the building management could require a tenant to provide the visitor's title, company the visitor works for, and other identifying characteristics. The building management could also require a tenant provide a photo of the visitor along with the request for use by the building management. For example, the building management could provide the photo to the front desk or it could be used with facial recognition software and sensors.

According to one or more embodiments, different tenants may be assigned different rights for generating and sending visitor invitations. For example, a tenant may be granted a broad right to generate mobile accesses invitations without limit. According to another embodiment, the tenant may be granted access by the building manager to generate and send visitor invitations that require management approval and/or credentials. Other restrictions can be imposed upon a tenant's ability and type of visitor invitations that are able to be generated and sent. Further, according to another embodiment, in some buildings there may be no need for any approval leaving a tenant to generate credentials for visitors without any approval.

The invitation 204 that is sent through the application or web portal by the tenant or resident is received in the application on the visitor's mobile device 206. The visitor views the invitation in the application on their mobile device and accepts the invitation. In some embodiments, a first-time visitor would be validated by a building management system. For example, according to one embodiment, the visitor can be validated by going to the building's front desk to present identification that the front desk attendant would match to the accepted invitation record in the application on the building management's system 216. In so doing, the building management would confirm identification of the guest and update the application such that the visitor is authorized for future visits, with an accepted invitation. For example, according to another embodiment, a visitor could register their fingerprint which is then linked to their profile. Future visitation would be validated by the fingerprint scanner on their mobile device or on-site thereby bypassing the front desk. In other embodiments, a first-time visitor that is required to go first to the building's front desk may be required to list all mobile devices that will be utilized in the future so the front desk attendant may update the visitor's profile and authorize the use of those devices for future visits. In one embodiment, a visitor may be required to visit the front desk each time they arrive at the building to be validated. In one embodiment, the authorization from the front desk for repeat visits may only be valid for a certain number or hours, days, weeks, etc. In another embodiment, the mobile device is validated based on data stored in the mobile device. The data stored can include certificates or credentials that correspond to the building elevator system or sub components thereof.

For non-first time visitors who receive, at 206, invitation 204 through the application on their mobile device, the visitor would accept the invitation and gain access 217 to the building as defined by the invitation. For example, the access may only be valid for the event's specified time frame and to the event's specified floor(s) and door locks. According to another embodiment, the invitation 204 can grant access to a group of secured locations in the building. For example, the group of secured locations can include multiple floors such as a lobby floor, the tenant's floor, an amenities floor such as a restaurant, gift shop, pool, gym, conference hall, or business center floor. For example, a visitor may be invited by a tenant to attend a business conference followed by a personal meeting in the tenant's office space. Accordingly, the invitation 204 could grant access to the visitor to at least the conference floors and the tenant's floor. Additionally, the tenant pay grant them access to additional floors as desired and allowed by business management. Upon arrival to the building with their mobile device and application open, the visitor gains entry into the building 208, as shown. In some embodiments, the visitor's access rights into the building will either allow for building access and elevator access or elevator access only. This access level would depend upon the time frame specified in the invitation and how it corresponds to the building's open and closed hours.

Upon entry to the building, the non-first time visitor's open application on their mobile device would communicate to the elevator bank to call the elevator to the visitor's current floor 210. According to one or more embodiments, this communication may be completed directly between the mobile device of the user and the elevator controller or the communication may be completed using another more indirect path. For example, the mobile device may communicate through one or more indirect path such as a cellular network, over the internet, through a local wireless communication network, a satellite connection, a peer to peer network, or any combination thereof. In some embodiments, once the visitor's arrival triggers the elevator call, the application would also communicate to the building management's application to update the accepted invitation on record to show as started, as dictated by the visitor's arrival to the building. According to one or more embodiments, this detection may be done using a geofencing implementation using local sensors, an independent location determination system (such as GPS system and/or a cellular network), or a combination thereof. In some embodiments, the visitor's application would alert the visitor that the elevator had been called and to proceed to the elevator bank. In other embodiments, if a visitor misses the elevator that is called, they may select to try again, but this may be restricted by building management such that a re-try may only be selected once and within a specified amount of time after arrival to the building. If neither occurs, building management could be notified through the application, along with the visitor in their application that would direct him or her to the front desk for re-authorization or verification. According to another embodiment, a helpdesk may be included that allows a visitor to talk directly to building management, on-site security, or an off-site security representative in order to resolve any invitation issues by being able to, for example, grant temperature access to resolve any issues.

Once the visitor is in the elevator that is called by the open application on their mobile device (operation 210), the elevator automatically selects the appropriate floor 212, based on the details in the invitation. In some embodiments, the elevator would be locked to only go to the floor selected so that additional stops on the way to that floor are prevented. According to another embodiment, the elevator can make intelligent dispatching decisions for highly-secured buildings such that passengers are not assigned to an elevator that is traveling to a floor that they are not authorized for. In other embodiments, other visitors, tenants, or guests would be directed to other elevators to go to their floors so that the elevator for this specific visitor would only stop at the floor in the invitation, or the floor to which they are authorized to visit.

Once the visitor is in the elevator and the appropriate floor is called (operation 212), the tenant is notified via their application on their mobile device (operation 214) that their visitor will arrive to their floor shortly. In some embodiments, a similar notification would also be delivered to the application on the building management's system. According to other embodiments, notifications to the tenant and/or building management about the visitor's location and progress accessing and travelling through the building can be provided. For example, a notification could be provided to the tenant and/or building management when the visitor is first detected walking into the building.

In another embodiment, a notification can be sent to the tenant and/or building management when the visitor boards the elevator at or before the end of the event's time frame, as specified by the invitation details. This notification allows for a tenant and building management to track that the visitor departed.

Figure 3:
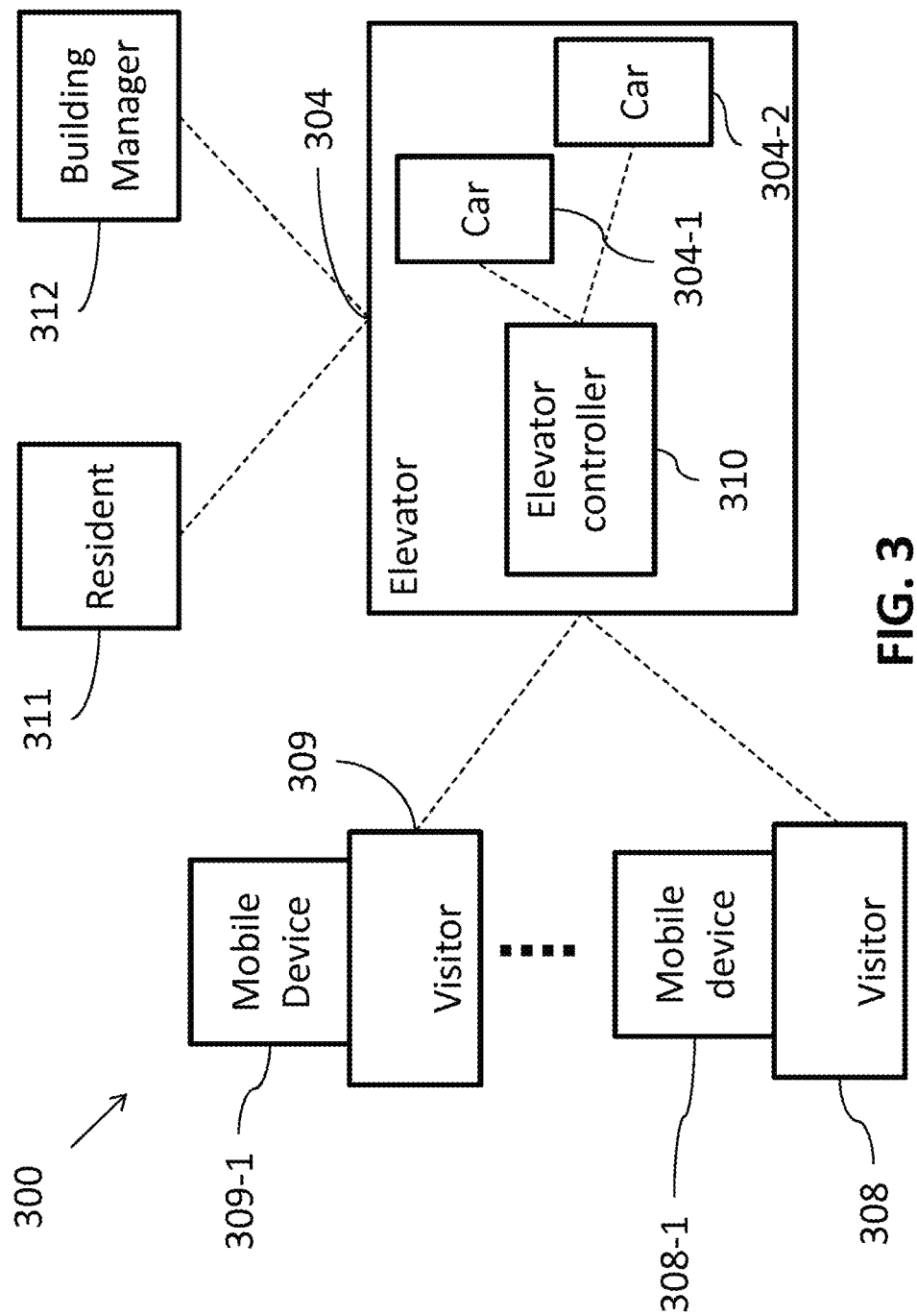
FIG. 3 depicts a block diagram of a system for managing visitor access to an elevator using a visitor mobile device in accordance with one or more embodiments of the present disclosure.

Referring to FIG. 3, a mobile visitor management system is shown according to one or more embodiments. As shown, a visitor 308 has a mobile device 308-1. Similarly, a separate visitor 309 has a mobile device 309-1. There can be as many visitors with accompanying mobile devices as desired and allowed by the building management. Each visitor's mobile device houses the application for sending and receiving invitations for guest access to the building's elevators. These communicate with the elevator 304. Each elevator may include a controller 310, which communicates to each individual elevator car 304-1, for example, such that the visitor's authorized floor, as dictated by the floor specified in their accepted invitation on their application, is selected for the car assigned to the visitor by the controller. The controller is responsible, then, for calling the car, designating it for the visitor, and selecting the floor for the visitor, all based on the invitation details in the visitor's application on their mobile device.

According to one or more embodiments, the elevator system 300 can detect if one or more visitors 309, 308 have accessed the correct elevator car 304-1 or 304-2. According to one embodiment, this can be done by tracking the mobile device 309-1 and 308-1 of each respective visitor 309 and 308. If a visitor accesses the incorrect car a lock out procedure can be implemented. For example, the lock out procedure can be designed to return a visitor that has entered an incorrect car back to the lobby so that the visitor does not access an incorrect floor. Once it returns the elevator 304 can call a car for the visitor and provided the updated call information to the visitor.

According to an embodiment, mobile device detection in the elevator is included to know if someone enters the elevator. This can include sensors in the elevator cars that can detect a broadcasting signal from the mobile device, image sensors that can process image data to detect the visitor, other known detection systems, or combination thereof. Alternatively, this can be done using an array of sensors positioned through the building which can triangulate the location of the device based on signal properties at each of the devices. Accordingly, in one or more embodiments, if a visitor enters the wrong elevator which is scheduled to travel to an unauthorized floor of that or any other user in the cab then the elevator can be stopped and security alerted. Further, according to one or more embodiments, the building management/security can setup access rules that can delete the requests to secured floors and notify the passengers. Alternatively, the building management can set conditions such that certain floors are ok to stop at for the visitor. According to another embodiment, the building management can require that all detected scenarios were a visitor enters an incorrect car are cancelled and returned to the lobby unless the building management overrides at the time of the detection.

The elevator 304 similarly communicates with the resident 311. In other embodiments, the resident may also be a tenant or employee working in the building. The elevator controller 310 communicates to the resident 311 when the visitor is in the elevator car. Similarly, the elevator 304 communicates with the building manager 312 via the elevator controller 310 to notify the building manager of the visitor's use of the elevator.

Figure 4:
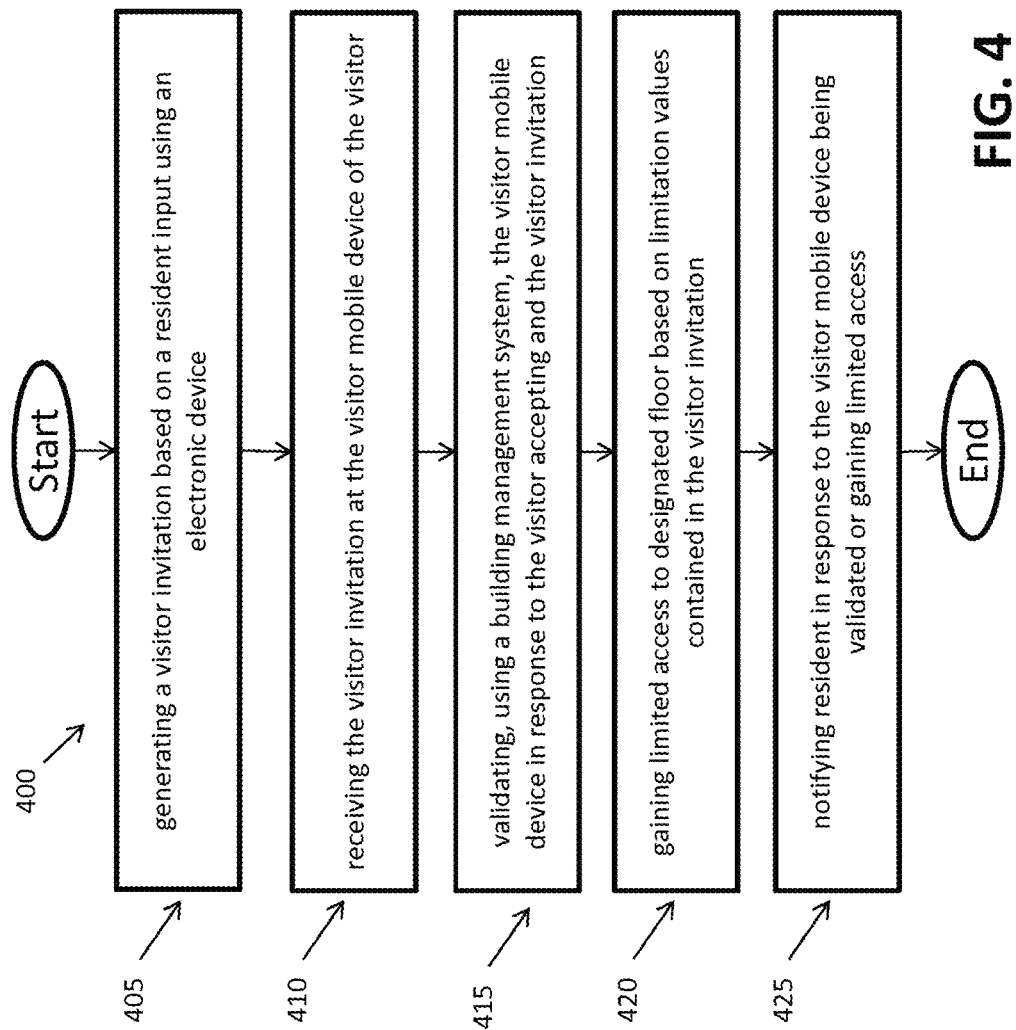
FIG. 4 depicts a flow diagram of a method of managing visitor access to an elevator using a visitor mobile device in accordance with one or more embodiments of the present disclosure.

FIG. 4 depicts a mobile visitor management system in accordance with one or more embodiments of the present disclosure. The method 400 includes first generating a visitor invitation based on a resident input using an electronic device (operation 405). Next, the method includes receiving the visitor invitation at the visitor mobile device of the visitor (operation 410). Next, the method includes validating, using a building management system, the visitor mobile device in response to the visitor accepting the visitor invitation (operation 415). Next, the method includes gaining limited access to a designated floor based on limitation values contained in the visitor invitation (operation 420). Lastly, the method includes notifying the resident in response to the visitor mobile device being validated or gaining limited access (operation 425).

According to another embodiment, the method may further include generating the visitor invitation using the building manager system. According to another embodiment, the method may further include generating the visitor invitation using the electronic device of the resident.

According to another embodiment, the method may further include requesting, using the electronic device of the resident, a grant to generate the visitor invitation from the building manager system, and receiving the grant to generate the visitor invitation from the building manager system.

According to another embodiment, the method may further include receiving privileges to directly access building resources from the building management device, storing the privileges in the visitor mobile device, and using the privileges stored in the visitor mobile device to directly communicate with building resources including the elevator.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable program instructions may execute entirely on the user's mobile device, partly on the user's mobile device, as a stand-alone software package, partly on the user's mobile device and partly on a remote computer or entirely on the remote computer or server. In the latter scenario, the remote computer may be connected to the user's mobile device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method of managing visitor access to a building having an elevator using a mobile device of the visitor, the method comprising:
   generating a visitor invitation based on a tenant input using an electronic device;
   receiving the visitor invitation at the mobile device of the visitor; and
   gaining limited access to designated floor based on limitation values contained in the visitor invitation;
   the visitor invitation is received at the visitor mobile device through a visitor access management application loaded on the visitor mobile device, the visitor invitation including a digital credential, and
   upon the visitor entry into the building and opening the application, the visitor mobile device is automatically validated by a building management system based on the digital credential.

2. The method of claim 1, further comprising:
   notifying tenant in response to the visitor mobile device being validated or gaining limited access.

3. The method of claim 1, wherein generating the visitor invitation based on a tenant input includes:
   generating the visitor invitation using one selected from a group consisting of the building management system and the electronic device of the tenant.

4. The method of claim 3, further comprising:
   requesting, using the electronic device of the tenant, a grant to generate the visitor invitation from the building manager system; and
   receiving the grant to generate the visitor invitation from the building management system.

5. A method of managing visitor access to an elevator using a mobile device of the visitor, the method comprising:
   generating a visitor invitation based on a tenant input using an electronic device;
   receiving the visitor invitation at the mobile device of the visitor; and
   gaining limited access to designated floor based on limitation values contained in the visitor invitation;
   wherein receiving the visitor invitation at the visitor mobile device of the visitor comprises:
   receiving, at the visitor mobile device, an email with a web link to download the visitor invitation, wherein clicking the link downloads the visitor invitation onto the visitor mobile device.

6. The method of claim 1, wherein validating, using the building management system, the visitor mobile device comprises:
   checking-in with a front desk of a building with the visitor mobile device;
   displaying a digital certificate on the visitor mobile device;
   visually inspecting the displayed digital certificate at the front desk; and
   entering validation of the visitor mobile device in the building management system based on the visual inspection.

7. The method of claim 1, wherein gaining limited access to designated floor based on limitation values contained in the visitor invitation comprises:
   receiving privileges to directly access building resources from the building management device;
   storing the privileges in the visitor mobile device;

using the privileges stored in the visitor mobile device to directly communicate with building resources including the elevator.

8. The method of claim 1, wherein gaining limited access to designated floor based on limitation values contained in the visitor invitation comprises:
transmitting a control signal to a building resource from the building management device based on the visitor mobile device location.

9. The method of claim 1, wherein the limitation values contained in the visitor invitation includes one or more from a group consisting of a defined time period, a specific floor, a single use limit, and a select number of accesses.

10. The method of claim 1, wherein notifying tenant in response to the visitor mobile device being validated or gaining limited access comprises:
notifying the tenant automatically when the visitor enters a select building resource that includes the elevator.

11. The method of claim 1, wherein notifying tenant in response to the visitor mobile device being validated or gaining limited access comprises:
notifying the tenant using one or more of a doorbell, an email, a text message, an automated call, a visual alert, an application notification, a vibration matter, and a power toggling of a select electronic device.

12. A system for managing visitor access to a building having an elevator using a mobile device, the system comprising:
an electronic device of a tenant configured to receive an input from the tenant and transmit the tenant input;
a building management system comprising:
a receiver configured to receive the tenant input from the electronic device of the tenant to generate a visitor invitation;
a controller configured to grant or generate the visitor invitation for building resources based on the tenant input, and grant limited access to the visitor mobile device; and
a transmitter configured to transmit the visitor invitation to the visitor mobile device, and transmit a grant to the visitor mobile device; and
the elevator comprising a controller and at least one car, wherein the elevator is configured to transport the visitor based on the limited access in the visitor invitation;
wherein the visitor invitation includes a digital credential, and
upon the visitor's entry into the building and opening the application, the controller is configured to automatically validate the visitor mobile device based on the digital credential.

13. The system of claim 12,
wherein the electronic device of the tenant is further configured to request a grant from the controller to generate the visitor invitation, and generate the visitor invitation upon receiving the grant from the controller, and
wherein the controller of the building management system is further configured to validate the visitor mobile device in response to the visitor mobile device arriving at the building resources with the visitor invitation.

14. A computer program product for managing visitor access to a building having an elevator using a visitor mobile device of the visitor, the computer program product comprising a non-transitory computer readable storage medium having program instructions embodied therewith, the program instructions executable by a processor to cause the processor to:
generating a visitor invitation based on a tenant input using an electronic device;
receiving the visitor invitation at the mobile device of the visitor; and
gaining limited access to designated floor based on limitation values contained in the visitor invitation;
the visitor invitation is received at the visitor mobile device through a visitor access management application loaded on the visitor mobile device, the visitor invitation including a digital credential, and
upon the visitor entry into the building and opening the application, the visitor mobile device is automatically validated by a building management system based on the digital credential.

15. The computer program product of claim 14, the computer program product comprising additional program instructions executable by the processor to cause the processor to:
request, using the electronic device of the tenant, a grant to generate the visitor invitation from the building management system; and
receive the grant to generate the visitor invitation from the building manager system.

16. The computer program product of claim 14, the computer program product comprising additional program instructions executable by the processor to cause the processor to:
check-in with a front desk of a building with the visitor mobile device;
display a digital certificate on the visitor mobile device;
visually inspect the displayed digital certificate at the front desk; and
enter validation of the visitor mobile device in the building management system based on the visual inspection.

17. The computer program product of claim 14, the computer program product comprising additional program instructions executable by the processor to cause the processor to:
receive privileges to directly access building resources from the building management device;
store the privileges in the visitor mobile device;
use the privileges stored in the visitor mobile device to directly communicate with building resources including the elevator.

18. The computer program product of claim 14, the computer program product comprising additional program instructions executable by the processor to cause the processor to:
validate, using a building management system, the visitor mobile device in response to the visitor accepting and the visitor invitation; and
notify tenant in response to the visitor mobile device being validated or gaining limited access.

* * * * *